United States Patent [19]
McRae

[11] 4,087,138
[45] May 2, 1978

[54] DISPENSING CABINET

[76] Inventor: William P. McRae, 22 Lincoln Ct., Buena Park, Calif. 90620

[21] Appl. No.: 785,200

[22] Filed: Apr. 6, 1977

[51] Int. Cl.² ............................................. A47B 81/06
[52] U.S. Cl. ...................................... 312/15; 206/387
[58] Field of Search ....................... 312/15, 16, 17, 18, 312/19, 295, 252; 206/387

[56] References Cited
U.S. PATENT DOCUMENTS

| 3,866,990 | 2/1975 | McRae | 312/15 |
| 3,969,007 | 7/1976 | Lowry | 206/387 |

*Primary Examiner*—Paul R. Gilliam
*Assistant Examiner*—Alex Grosz
*Attorney, Agent, or Firm*—Fulwider, Patton, Rieber, Lee & Utecht

[57] ABSTRACT

A storage and dispensing cabinet in which tape cassettes or other similar articles are slidably received in parallel slots formed by a housing. Each slot is provided with an integrally formed ejector that includes a rocker positioned beneath the floor of the slot, an ejection arm that extends into the slot along the back of the cassette, a retaining portion that normally extends along the open front end of the slot to positively retain a cassette and an actuator that is accessible from the exterior of the housing. By depressing the actuator, the rocker can be flexed so that the retaining portion moves away from the front of the cassette, while the ejecting arm, which remains substantially unflexed, pushes the front edge of the cassette through the open end of the slot so that it can be grasped and removed. The entire housing can be mounted on a stand so that it can be rotated between an open position and a closed position.

20 Claims, 8 Drawing Figures

DISPENSING CABINET

BACKGROUND OF THE INVENTION

The present invention relates to storage cabinets for tape cassettes or the like, and more particularly to such cabinets in which ejectors are provided to at least partially eject selected cassettes from a housing.

A variety of constructions have been proposed for cabinets in which tape cassettes are stored in slots or compartments arranged in a row. These cabinets often include an ejector mechanism that normally retains the cassettes within the slots but, when actuated, ejects them to a position in which they can be easily grasped and removed. One such previously known cabinet is described in U.S. Pat. No. 3,866,990 to McRae. Although this cabinet has many advantageous features, it requires two interacting moving parts to form the ejector for each slot, and it would be desirable to avoid expense and complexity by using only one such part. Another previously known cabinet is described in U.S. Pat. No. 3,969,007 to Lowry. It reduces the number of ejector parts to one by using sharply defined hinge points of greatly reduced thickness at the rear of the ejector where it bends as it is compressed when actuated. The concentration of stresses at these hinge points may serve to weaken the ejectors causing them to break or lose their resilience.

A disadvantage associated with both of the cabinets discussed above is that they leave the open ends of the slots uncovered when not in use, exposing the cassettes to dirt and detracting from the appearance of the device. The primary objective of the present invention is to provide a cabinet for tape cassettes that effectively overcomes the above disadvantages of the prior art.

SUMMARY OF THE INVENTION

The present invention resides in an improved and unique cabinet for storing and dispensing conventional tape cassettes and other similar articles, such as microfilm cartridges, that is of simple and long lasting construction having only one movable part for the ejection of each cassette. The cabinet includes a housing that forms a row of parallel slots, each adapted to slidably receive a cassette of predetermined size and shape. Each of the cassette ejectors that correspond to the individual slots is formed by an integral piece of molded plastic that does not include any sharply defined hinge portions where stresses are concentrated. It comprises a bendable rocker pivotably mounted below the floor of the slot and an ejector arm, connected only to the rocker, that projects upwardly through an opening in the floor and along the back of the cassette, a retaining portion that extends along a part of the open slot end to retain the cassette and an actuator accessible from the exterior of the housing.

When the actuator is depressed, the ejector pivots so that the ejecting arm urges the cassette forward toward the open slot end. It is not possible, however, for the cassette to pass over the retaining portion unless the actuator is depressed sufficiently to bend the rocker, which flexes smoothly, distributing the stress over a substantial area. Due to the absence of stress concentrating folds over creases, any tendency of the ejector to fail or lose its resilience after repeated operation is minimized and it retains its ability to snap back sharply to an unflexed position in which it provides positive retention for the cassette.

According to another aspect of the invention, the housing is supported by a stand to which it is connected at each end by a swivel joint. The housing can be rotated between a closed position in which the open slot ends face downwardly and an open position in which the open slot ends are generally vertical and exposed to provide access to the cassettes.

Other features and advantages of the present invention will become apparent from the following detailed description, taken in conjunction with the accompanying drawings which illustrates, by way of example, the principles of the invention.

DESCRIPTION OF THE PREFERRED EMBODIMENT

Figure 1:
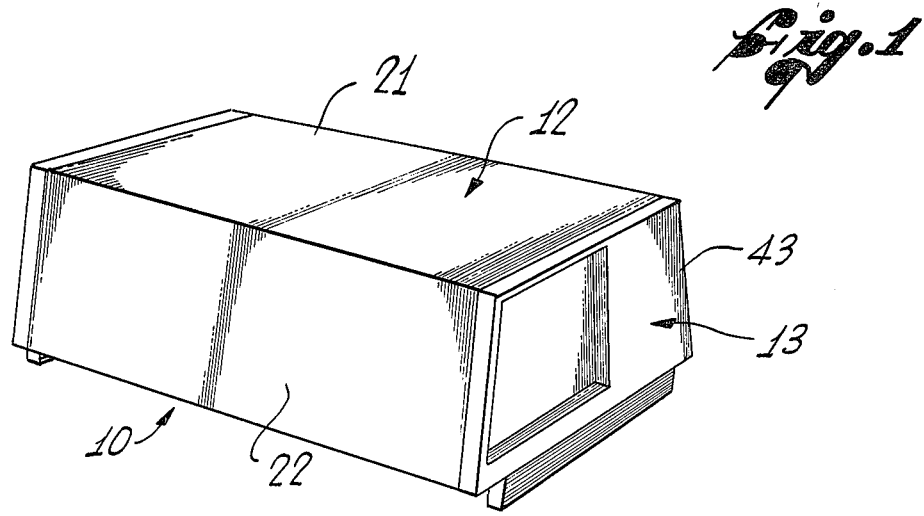
FIGS. 1 and 2 are perspective views of a storage and dispensing cabinet for tape cassettes that embodies the novel features of the present invention, the cabinet being shown in closed and open positions, respectively.

The present invention resides in a storage and dispensing cabinet 10 for tape cassettes 11, illustrated in the accompanying drawings. In general, the cabinet includes a housing 12 in which the cassettes are stored, a stand 13 on which the housing is rotatably supported for movement between open and closed positions, and a plurality of ejectors 14 that project into the stand for retaining and ejecting the cassettes.

The housing 12 includes a box-like outer shell 15 and an insert 16 by which the interior of the shell is divided into a row of parallel, vertical, rectangular slots 17. Each slot is dimensioned to slidably receive one of the cassettes 11 standing on end, the cassettes being of a standardized, two reel, rectangular, plastic construction. The insert forms a floor 18 for each slot along with a pair of vertical sidewalls 19 that extend slightly less than half way from the floor to the top of the cassette and a back wall 20 that joins the sidewalls and rests against the back 21 of the shell.

So that the cassettes 11 can be readily inserted and withdrawn, the top 22 of the shell 15, which forms the top walls of the individual slots 17, is slightly inclined from the horizontal to provide the slots with open front ends 23 that are taller than the closed interior ends. A shelf 24 that is part of the insert 16 forms an extension of the floors 18 along the open front ends of the slots and carries printed or embossed indicia 25 of the contents of the cassettes 11. Additional changeable indicia can be inserted in pockets 26 on a front edge of the shelf. Although the housing 12 utilized in this embodiment of the invention is of two-piece plastic construction, it can also be formed by interlocking plastic panels, as generally described and illustrated in the above-mentioned U.S. Pat. No. 3,866,990 to McRae.

Figure 4:
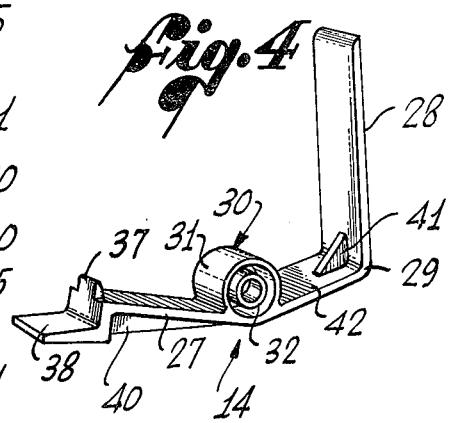
FIG. 4 is an enlarged perspective view of the ejector of the cabinet.
Figure 5:
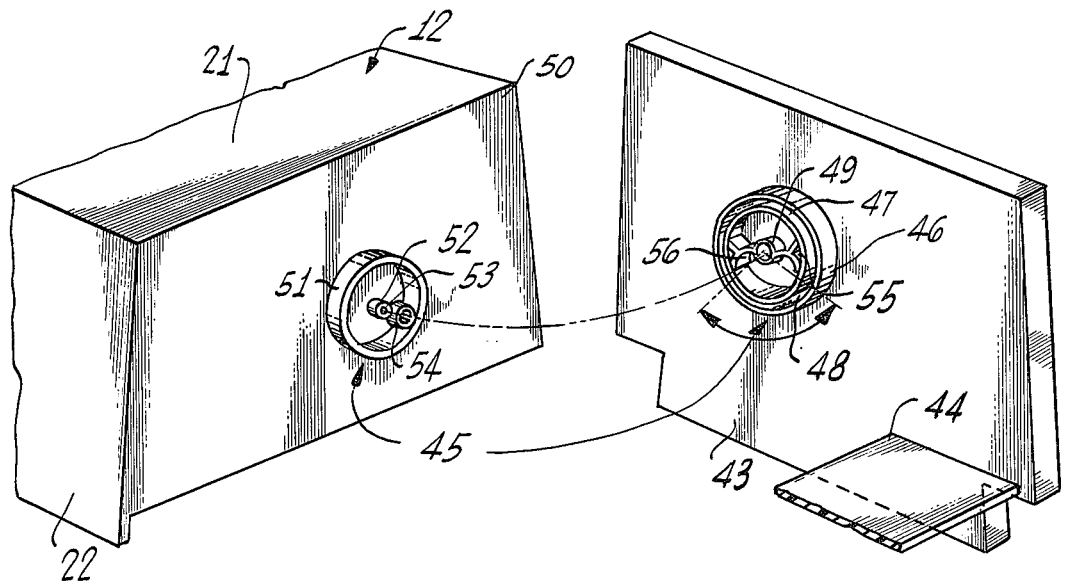
FIG. 5 is an enlarged, fragmentary, exploded view showing one end of the cabinet housing and the opposing end of a stand separated to expose a swivel joint.
Figure 7:
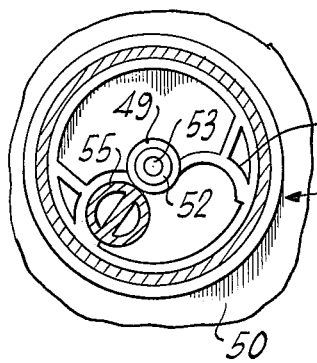
FIGS. 7 and 8 are enlarged fragmentary views of the swivel joint shown in its open and closed positions, respectively.
Figure 6:
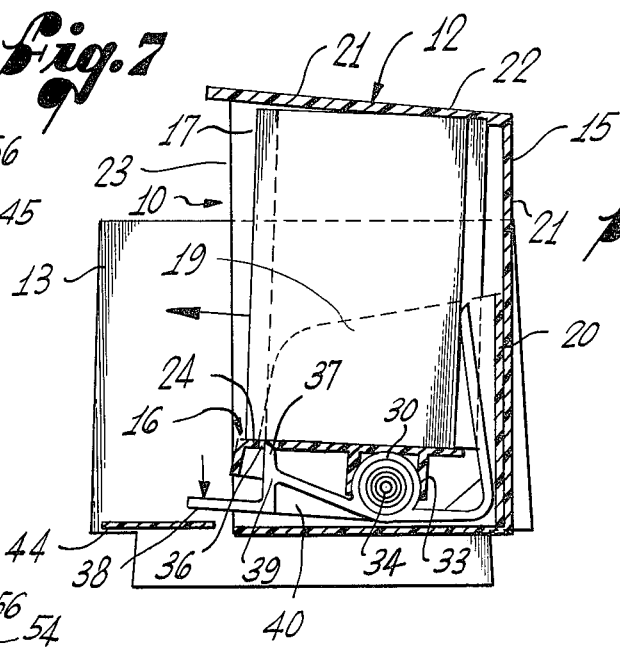
FIG. 6 is an enlarged cross-sectional view similar to that of FIG. 3 showing the ejector in a flexed position.
Figure 8:
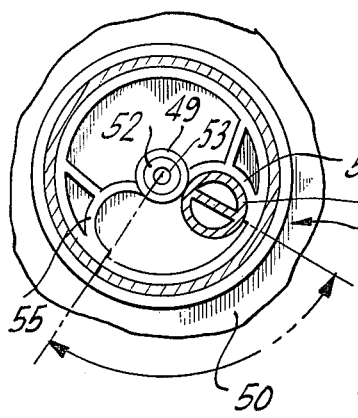

There is a separate ejector 14 for each slot 17, as shown in FIG. 4. This ejector is a single integrally formed molded plastic part that normally provides positive retention of the cassette within the slot, but when actuated, ejects the cassette to a position in which it is easily grasped and removed. There are no sharply defined stress concentrating hinge points on the ejector where it would tend to fail or lose its reslience. Instead, the ejector flexes smoothly in an area separated from the point of contact with the cassette, giving its ejecting motion added force and snap.

Figure 3:
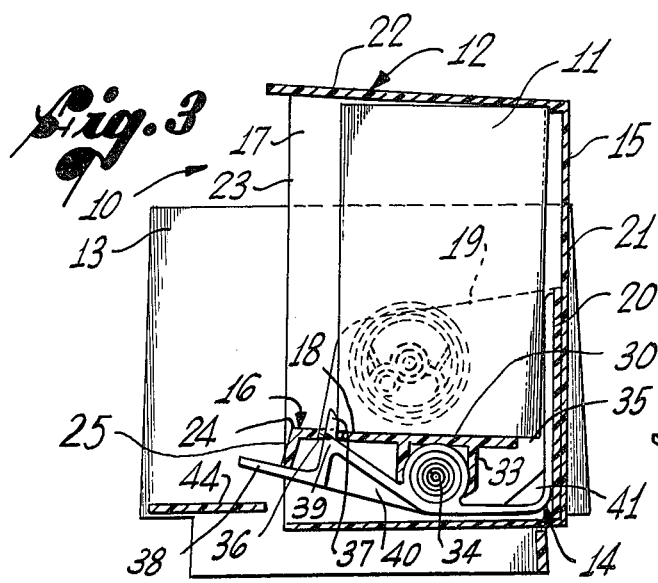
FIG. 3 is an enlarged cross-sectional view taken along the line 3 — 3 in FIG. 1 showing the cabinet in its open position with the ejector in an unflexed position.

Each ejector 14 includes a generally horizontal rocker portion 27 and a generally vertical ejecting arm 28 that extends upwardly from the back end 29 of the rocker. At the center of the rocker is an upwardly protruding annular journal portion 30 having a generally cylindrical outer ring 31 and a concentric inner ring 32. The rocker is suspended in a space between the floor 18 of the slot 17 and the bottom of the outer housing shell 15. As shown in FIG. 3, the outer ring is received in a sub-housing 33 that depends from the underside of the floor, and a pivot pin 34 that is part of the sub-housing extends crosswise to the rocker into the inner ring so that the ejector can be rocked on the pin through a small angle.

At the back of the slot 17, the ejecting arm 28 projects through an ejector opening 35 between the floor 18 and the back wall 20 and extends along the back edge of the cassette 11. A small retainer opening 36 in the floor 18 at the front of the slot permits a retainer portion 38 on the front end of the rocker 27 to project upwardly through the floor, forming a lip that extends across the bottom of the slot and retaining the cassette within the slot when the ejector 14 is in its normal unflexed position. An actuator portion 38 that depends from the front end 29 of the rocker extends from beneath the shelf 22 and is accessible from the exterior of the housing 12 to operate the ejector.

A rigidifying rib 40 extends along the part of the rocker 27 in front of the journal portion 30, and a second such rib 42 reinforces the back inside corner of the ejector 14 where the ejecting arm 28 is joined to the rocker. There is an unreinforced, flat, bendable portion 31 of the rocker between the journal portion 21 and the reinforcing rib.

The ejectors 14 cannot rotate freely on the pivot pins 36 through an angle large enough to withdraw the retaining portions 37 from the path of the cassettes 11 because the ejecting arms 28 limit the rotation by engaging the back edges of the cassettes. Therefore, the cassettes are positively retained in the slots 17 by the retaining portions, regardless of the position in which the housing 12 is held. When it is desired to eject a cassette, however, the actuator 38 is simply depressed by a finger tip applying a torque sufficient to flex the bendable portion 42 of the rocker 27, thereby causing the front half of the rocker to continue to rotate while the back half remains substantially stationary until the retaining portion 37 is withdrawn through the retainer opening 36. As soon as the retaining portion is removed from the path of the cassette, the ejecting arm 28 snaps forward, allowing the ejector to reassume its unflexed condition as the cassette is pushed partially out of the slot so that it can be easily grasped and withdrawn. When the cassette is reinserted, it simply rides over the top of the retaining portion and then flexes the ejector again by pushing the retaining arm backwardly until the retaining portion snaps up in front of the cassette to lock it in place.

It should be noted that the greatest stresses created by flexing the ejector 14 are distributed over the bendable portion 42 of the rocker 27 to withstand a large number of flexing cycles without breakage or loss of resilience. The ejecting force is applied to the cassette 11 by the top end of the ejecting arm 28 for maximum leverage and ease of operation.

Another aspect of the invention relates to the stand 13 which is generally U-shaped, including two vertical end pieces 43 joined near their front edges by a flat horizontal plate 44. The housing 12 is rotatably supported between the end pieces by a pair of swivel joints 45, permitting the housing to be moved between a closed position in which the cassettes 11 are protected and a open position in which the cassettes are readily accessible.

Figure 2:
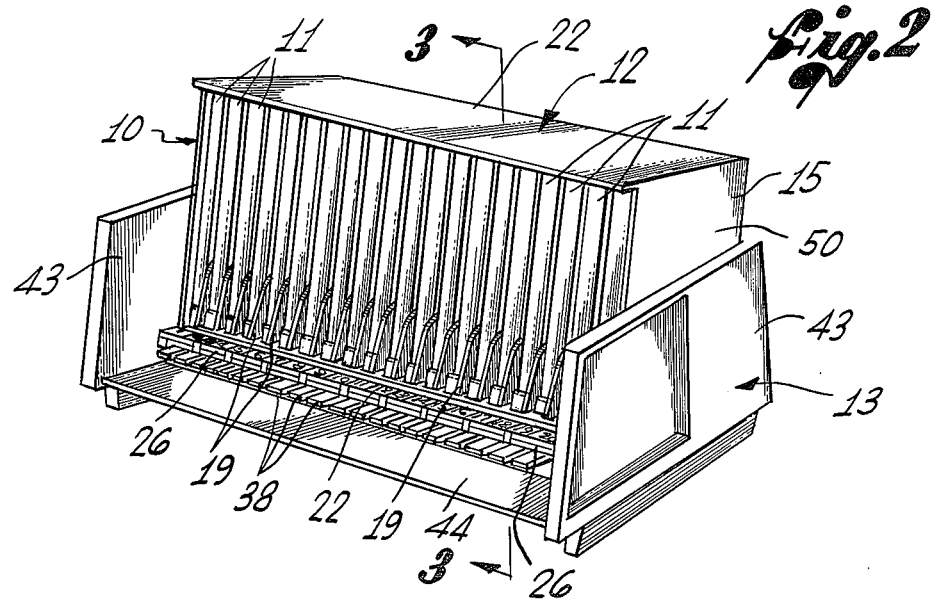

To form each swivel joint 45, two concentric cylindrical portions 46 and 47 define an annular groove 48 on the surface of an end piece 43 that faces the housing 12 and a socket 49 projects horizontally at the center of the groove. The opposing end wall 50 of the housing shell 15 carries a ring 51 that projects into the annular groove and a slightly smaller ring 52 is inserted in the socket 49. The smaller ring 52 receives a pin 53 carried by the stand 13 for added support. Rotation of the housing 12 is limited to about 90 degrees by a round lug 54 carried on the end wall of the housing. With the housing in a closed position (FIG. 1) and the open front ends 23 of the slots 17 facing downwardly, the lug rests against a first arcuate stop 55 on the end piece. In the open position of the housing (FIG. 2), with the open ends of the slots being approximately horizontal and exposed, the lug rests against a second arcuate stop 55.

It will be understood from the foregoing that the construction of the cabinet 10, which is simply and easily manufactured, provides the important advantages of positive cassette retention and smooth, relatively trouble-free operation of the ejectors. While a particular form of the invention has been illustrated and described, it will be apparent that various modifications can be made without departing from the spirit and scope of the invention.

I claim:

1. A storage and dispensing cabinet for generally rectangular articles, such as tape cassettes and the like, of a predetermined size comprising:

a housing forming a plurality of parallel rectangular slots arranged in a row, each of said slots being shaped and dimensioned to slidably receive a tape cassette of said predetermined size and having two parallel sidewalls, a top wall, a back wall, a floor, an ejector opening between said floor and said back wall, and an open front end through which said cassettes can be inserted and withdrawn;

a stand;

swivel means for supporting said housing on said stand and permitting rotation of said housing between a closed position in which said open ends of said slots are substantially horizontal and an open position in which said open ends of said slots are substantially vertical; and a plurality of cassette ejector means, each associated with one of said slots for normally retaining a cassette in said slot and for ejecting said cassette from said slot when actuated;

each of said ejector means being an integrally formed, one-piece, molded plastic, flexible member including a rocker having a front end and a back end, attachment means for pivotally attaching said rocker to said housing beneath said floor, a free standing ejecting arm projecting from said back end of said rocker through said ejector opening to engage said cassette from behind, an actuator portion attached to said front end of said rocker and accessible from the exterior of said housing, an upstanding retaining portion projecting upwardly from said front end of said rocker at the open front end of said slot to retain said cassette in said slot, and a flat bendable portion between said attaching means and said ejecting arm;

each of said ejector means having an unflexed position in which said cassette is positively received within said corresponding slot between said ejecting arm and said retaining portion, and a flexed position assumed in response to a force applied to said actuator in which said ejecting arm is pivoted away from said back wall while remaining substantially unflexed to push said cassette at least partially through said open front end of said retraining portion to a position below said floor to permit said cassette to move through said open front end.

2. The storage and dispensing cabinet of claim 1, wherein said housing includes a pivot pin beneath said floor of each of said slots, and said attaching means comprises a journal portion intermediate said front and back ends of said rocker in which said pivot pin is rotatably received.

3. The storage and dispensing cabinet of claim 1 further comprising a retainer opening formed in said floor of each of said slots, each of said retaining portions projecting through one of said retainer openings when said cassette ejector means are in said unflexed positions.

4. The storage and dispensing cabinet of claim 1 wherein said housing includes a bottom extending beneath said floors of said slots, said rockers being positioned between said bottom and said floors.

5. The storage and dispensing cabinet of claim 4 wherein said actuators project from between said bottom and said floors.

6. The storage and dispensing cabinet of claim 1 wherein said stand is generally U-shaped having two vertical end pieces joined by a horizontal plate, said housing being disposed between said end pieces.

7. The storage and dispensing cabinet of claim 1 wherein said swivel means includes at least two stop means for limiting the rotation of said housing.

8. A storage and dispensing cabinet for generally rectangular articles, such as tape cassettes and the like, of a predetermined size, comprising:

a housing forming a plurality of parallel rectangular slots arranged in a row, each slot being shaped and dimensioned to slidably receive one of said tape cassettes and having two parallel sidewalls, a top wall, a back wall, a floor, and an open front end through which said cassettes can be inserted and withdrawn;

a plurality of cassette ejector means, each associated with one of said slots for normally retaining a cassette in said slot and for ejecting said cassette from said slot when actuated;

a stand; and swivel means for supporting said housing on said stand and permitting rotation of said housing between a closed position in which said open ends of said slots are substantially horizontal and an open position in which said open ends of said slots are substantially vertical and exposed.

9. The storage and dispensing cabinet of claim 8 wherein said stand is generally U-shaped having two vertical end pieces joined by a horizontal plate, said housing being disposed between said end pieces.

10. The storage and dispensing cabinet of claim 9 wherein said swivel means includes at least two stop means for limiting the rotation of said housing.

11. A storage and dispensing cabinet for articles such as tape cassettes and the like, comprising:

a housing forming a plurality of parallel slots, each having an open end, for slidably receiving tape cassettes;

a plurality of one piece integrally formed flexible ejectors; and a plurality of attachment means for pivotally attaching each of said ejectors to said housing, said attachment means including a pivot pin and a journal portion in which said pivot pin is rotatably received;

each of said ejectors incluing a flexible rocker portion to which said attachment means is connected, an ejecting arm projecting from one end of said rocker to engage the rear of said cassette, said rocker being bendable between said attachment means and said arm, an actuator portion accessible from the exterior of said housing and spaced from said attachment means whereby said rocker can be caused to pivot, and a retaining portion projecting from said rocker and opposing said arm, the distance between said retaining portion and said arm being such that the cassette is pivotably retained therebetween in the absence of flexing of said ejector, said arm being freely movable without obstruction along the back of said cassette upon flexing of said ejector to dispense said cassette.

12. The storage and dispensing cabinet of claim 11 wherein each of said rockers includes a flat portion between said journal portion and said ejecting arm, and a reinforcing rib extending from said journal portion to said front end.

13. The storage and dispensing cabinet of claim 11 further comprising a retainer opening formed in said floor of each of said slots, each of said retaining portions projecting through one of said retainer openings when said cassette ejector means are in said unflexed position.

14. The storage and dispensing cabinet of claim 11 wherein said housing includes a bottom extending beneath said floors of said slots, said rockers being positioned between said bottom and said floors.

15. The storage and dispensing cabinet of claim 14 wherein said actuators project from between said bottom and said floors.

16. The storage and dispensing cabinet of claim 11 wherein said ejector is molded of plastic.

17. The storage and dispensing cabinet of claim 11 further comprising:

a stand; and swivel means for supporting said housing on said stand and permitting rotation of said housing between a closed position and an open position.

18. The storage and dispensing cabinet of claim 17 wherein said stand is generally U-shaped having two vertical end pieces joined by a horizontal plate, said housing being disposed between said end pieces.

19. The storage and dispensing cabinet of claim 18 wherein said swivel means includes at least two stop means for limiting the rotation of said housing.

20. The storage and dispensing cabinet of claim 11 further comprising:

a stand; and swivel means for supporting said housing on said stand and permitting rotation of said housing between a closed position in which said open ends of said slots are substantially horizontal and an open position in which said open ends of said slot are substantially vertical.

* * * * *